United States Patent
Bruno et al.

[11] Patent Number: 5,810,547
[45] Date of Patent: Sep. 22, 1998

[54] VEHICLE LIFT ASSEMBLY

[75] Inventors: Michael Roman Bruno, 4247 W. Beach Rd., Oconomowoc, Wis. 53066; William Walter Belson, III, Nashotah, Wis.; Robert Monroe Boyd, Watertown, Wis.

[73] Assignee: Michael Roman Bruno, Oconomowoc, Wis.

[21] Appl. No.: 747,176

[22] Filed: Nov. 12, 1996

[51] Int. Cl.$^6$ ..................................................... B62P 1/54
[52] U.S. Cl. ........................................... 414/543; 212/180
[58] Field of Search .................................. 414/540–543, 414/462, 921; 212/180, 901; 254/241, 242, 334, 338, 329, 332

[56] References Cited

U.S. PATENT DOCUMENTS

| | | | |
|---|---|---|---|
| 2,461,401 | 2/1949 | Trombley | 414/543 |
| 2,755,943 | 7/1956 | Payne et al. | 414/543 |
| 3,671,015 | 6/1972 | Sullivan | 254/334 X |
| 4,069,922 | 1/1978 | Hawkins | 414/543 X |
| 4,391,379 | 7/1983 | Paffrath | 414/543 X |
| 4,406,574 | 9/1983 | Riley | 414/543 |
| 4,746,263 | 5/1988 | Cook | 414/543 |
| 4,881,864 | 11/1989 | Amato | 414/543 |
| 4,991,810 | 2/1991 | Andrus et al. | 414/921 X |
| 5,114,120 | 5/1992 | Bartelt et al. | 254/323 |
| 5,147,106 | 9/1992 | Bartelt et al. | 296/202 |
| 5,429,253 | 7/1995 | McWett | 414/543 X |
| 5,431,526 | 7/1995 | Peterson et al. | 414/546 |
| 5,435,450 | 7/1995 | Delcambre | 254/334 X |
| 5,567,107 | 10/1996 | Bruno et al. | 414/462 |

FOREIGN PATENT DOCUMENTS

| | | | |
|---|---|---|---|
| 3519299 | 12/1986 | Germany | 414/540 |

OTHER PUBLICATIONS

Bruno ASL–325 Space Saver Brochure.

*Primary Examiner*—David A. Bucci
*Attorney, Agent, or Firm*—Foley & Lardner

[57] ABSTRACT

An improved vehicle lift assembly for loading and unloading objects into and from a vehicle includes a base configured for being mounted to the vehicle, a vertical post extending from the base, an extension boom extending outward from a centerline of the post, a swing arm rotatably coupled to the extension arm, extension boom, an engaging mechanism supported by the swing arm for releasably engaging the object, and an actuator for raising and lowering the engaging mechanism to raise and lower the engaged object.

11 Claims, 1 Drawing Sheet

VEHICLE LIFT ASSEMBLY

BACKGROUND OF THE INVENTION

1. Field of the Invention

The present invention relates to generally mobile hoists attached to vehicles. In particular, the present invention relates to a mobile hoist or vehicle lift assembly designed to be attached to a vehicle to assist handicapped or otherwise physically impaired individuals in lifting objects into or out of a vehicle.

2. Description of the Prior Art

Mobile hoists or vehicle lift assemblies are conventionally attached to a vehicle to assist handicapped or otherwise physically impaired individuals in lifting objects into or out of a vehicle. Mobile hoists are particularly helpful to individuals who require wheelchair or other motive assistance devices due to age or other physical impairment or handicap. These hoists provide such individuals with greater independence in conducting their daily lives by reducing reliance on others for help with a needed wheelchair, scooter or cart.

The mobile hoists or lifts typically include a base, a vertical post, a swing arm which rotates about the centerline of the post and a belt coupled to an end of the swing arm for engaging the object such as a scooter or wheelchair. Usually, the belt is equipped with a claw which engages a portion of the object, such as a docking device.

The hoist also generally includes an actuator for raising and lowering the belt to raise and lower the object relative to the vehicle. Once the object is raised, the swing arm is rotated to position the object within the vehicle. Once in the vehicle, the object is lowered by the actuator and disengaged from the claw. Because of limited vehicle space, hoists are typically manufactured as assemblies which may be easily assembled for use and disassembled for compact storage when not being utilized.

Conventional mobile hoists are usually mounted within the trunk or other storage compartment of the vehicle so as to load and unload the object into the storage compartment. However, many vehicles today have enlarged bumpers or steps along the rear or side of the vehicle. As a result, many conventional mobile hoists are not well suited for many of today's vehicles. This problem is further exacerbated when the object to be loaded into the vehicle and unloaded from the vehicle is rather large, such as a wheelchair or scooter. As a result, a mobile hoist capable of loading objects into all types of vehicle configurations, including vehicles having enlarged bumper overhangs and side steps would be a significant advancement in the art.

SUMMARY OF THE INVENTION

The present invention is an improved vehicle lift assembly for loading and unloading objects into and from a vehicle. The vehicle lift assembly includes a base configured for being mounted to the vehicle, a vertical post extending from the base, an extension boom extending outward from a centerline of the post, a swing arm rotatably coupled to the extension boom, an engaging mechanism supported by the swing arm for releasably engaging the object, and an actuator for raising and lowering the engaging mechanism to raise and lower the engaged object.

DETAILED DESCRIPTION OF THE PREFERRED EMBODIMENTS

Figure 1:
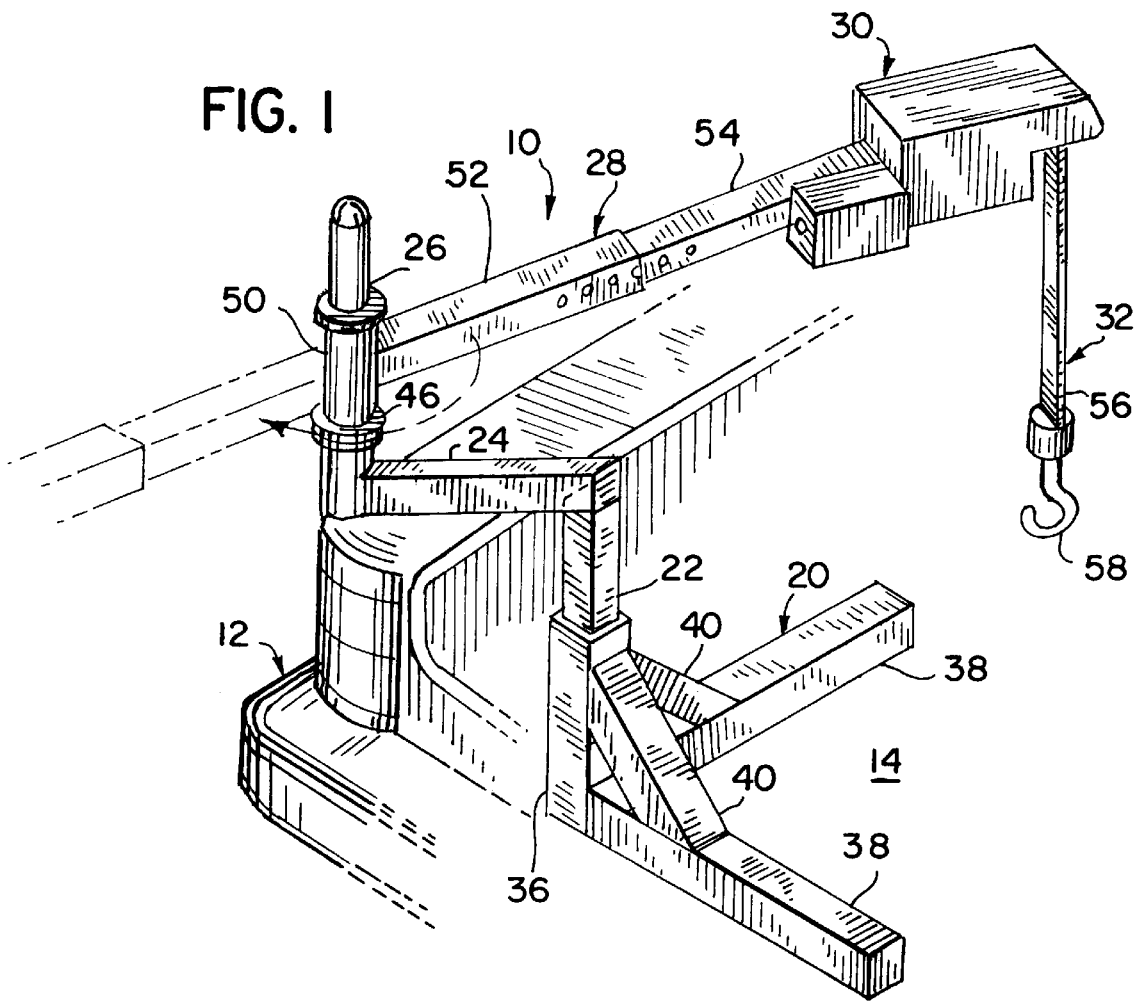
FIG. 1 is a perspective view of a vehicle lift assembly mounted to within a storage compartment of a vehicle.

FIG. 1 is a perspective vehicle lift assembly 10 positioned with a storage area of a vehicle. In particular, FIG. 1 illustrates vehicle lift assembly 10 supported within trunk 14 of automotive vehicle 12. Vehicle lift assembly includes base 20, vertical post 22, extension boom 24, offset post 26, swing arm 28, lift head 30 and engaging mechanism 32. Base 20 is configured for being mounted to a vehicle. In the preferred embodiment illustrated, base 20 is configured for being mounted in trunk 14 of vehicle 12. Base 20 includes vertical support tube 36, legs 38 and truss members 40. Vertical support tube 36 extends generally vertical relative to legs 20 and defines a hollow interior for telescopically receiving vertical post 22. Legs 20 are fixedly coupled to vertical support 36 and extend perpendicular to one another and to vertical post 36. Legs 20 are fixedly mounted to vehicle 12 as set forth and described in U.S. Pat. No. 4,991,810, assigned to Michael Roman Bruno (herein incorporated by reference). Truss members 40 extend between legs 38 and vertical post 36 to securely stabilize vertical post 36 relative to legs 38. Legs 38 support and stabilize vehicle lift assembly 10 within a vehicle storage compartment such as trunk 14. As can be appreciated, base 20 may have a variety of alternative configurations and sizes depending upon the size and configuration of vehicle lift assembly 10 and vehicle 12.

Vertical post 22 is a generally vertical tube or bar vertically extending upward from base 20. In the preferred embodiment illustrated, vertical post 22 is telescopically received within vertical support 36 of base 20 to enable post 22 to be extended from or retracted within support 36 to adjust the height which post 22 extends upward from base 20. Because vertical post 22 may be extended from base 22, lift arm assembly 10 may be adopted to vehicles having deep storage compartments such as deep trunks Alternatively, vertical post 22 may be fixedly coupled to vertical support 36 or may be integrally formed as part of vertical support 36. Vertical post 22 supports extension boom 24.

Extension boom 24 is an elongate member extending outward from the vertical center line of vertical post 22. Extension boom 24 preferably extends outward from the center line of post 22 a sufficient distance so as to enable swing arm 28 to swing outward for engaging objects such as wheelchairs or scooters with engaging mechanism 32 and for enabling swing arm 28 to be rotated so as to position the engaged object within the storage compartment of a vehicle having an enlarged bumper or side step. In the preferred embodiment, extension boom 24 preferably has a length of between about six inches and about eighteen inches. In the preferred embodiment illustrated, extension boom comprises a bracket having one end fixedly coupled to an end of vertical post 22. Alternatively, extension boom 24 may be rotatably coupled to vertical post 22 so as to rotate or pivot about the center line of vertical post 22. Such an alternative configuration would increase the range of motion of swing arm 28 and engaging mechanism 32 to enable engaging mechanism 32 to engage objects located at various positions proximate vehicle 12.

Offset post 26 is a cylindrical tube or post extending in a generally vertical direction upward from extension boom 24 along a vertical center line or axis horizontally offset from the vertical axis of vertical post 22. Offset post 26 is sized and configured for rotatably supporting swing arm 28. In the preferred embodiment illustrated, offset post 26 includes a thrust facing washer 46 fixedly coupled about offset post 26 to support swing arm 28 at an elevated position above extension boom 24. In the preferred embodiment illustrated, offset post 26 has a total length of approximately 14" and a length of approximately 11.5" above thrust facing washer 46.

Swing arm 28 is rotatably mounted to offset post 26 above thrust facing washer 46 to enable rotation of swing arm 28 relative to offset post 26 and extension boom 24. In the preferred embodiment, swing arm 28 includes sleeve or tube 50, outer arm 52 and lift arm 54. Tube 50 is a generally cylindrical hollow member sized to receive offset post 26 with sufficient clearance between tube 50 and offset post 26 to enable tube 50 to rotate relative to offset post 26. To facilitate rotation of tube 50 and swing arm 28 about offset post 26, tube 50 may be further provided with bearings or low resistance coatings, such as TEFLON. Tube 50 is vertical supported about offset post 26 by thrust washer 46 of vertical post 26. Tube 50 supports outer arm 52 and lift arm 54.

Outer arm 52 is preferably fixedly coupled to tube 50 and extends outward from the center line or axis of offset post 26 and tube 50. Preferably, outer arm 52 extends outward from tube 50 at an angle of about five degrees to fifteen degrees with respect to a horizontal. In the preferred embodiment illustrated, outer tube 52 is a generally hollow rectangular tube sized for telescopically receiving lift arm 54 to enable the overall length of lift arm 28 to be adjusted by either extending lift arm 54 from outer arm 52 or retracting lift arm 52 further into outer arm 52. Alternatively, outer arm 52 and lift arm 54 may be fixedly coupled to one another or may be integrally formed as a single unitary arm extending from tube 50.

Lift arm 54 is generally an elongate member telescopically received within outer arm 52. Lift arm 54 extends further outward from outer arm 52 and supports lift head 30. In the preferred embodiment illustrated, lift arm 54 has an overall length of about thirty inches.

Lift head 30 is fixedly coupled to lift arm 54. Preferably, lift head 30 is mounted at an end of lift arm 54. Lift head 30 includes an actuator 68 (shown in FIG. 2) for raising and lowering engaging mechanism 32 so as to raise and lower an object engaged by engaging mechanism 32.

Engaging mechanism 32 is supported by lift head preferably at an end of swing arm 28. Engaging mechanism 32 preferably includes lift belt 56 and claw or hook 58. Lift belt 56 is generally an elongated, flexible belt having a first end coupled to actuator 68 within lift head 30 and a second end coupled to hook 58. Lift belt 56 is wound about a winding spool of actuator 68 (shown in FIG. 2) to vary the length of belt 56 extending below actuator head 30 and to vary the height of hook 58.

Hook 58 is fixedly coupled to a second end of belt 56 and specifically configured for engaging a selected object such as a wheel chair, scooter or cart. As can be appreciated, hook 58 may have a variety of alternative configurations depending upon a particular object being engaged by engaging mechanism 32. Furthermore, as can be appreciated, hook 58 may alternatively be omitted where other options are available for engaging the object. For example, belt 56 may alternatively be wrapped about or tied to an object to be lifted. As can further be appreciated, belt 56 may comprise any of a variety of elongated somewhat flexible members or lift lines which are capable of being coiled about a spool to raise and lower hook 58.

Overall, vehicle lift assembly 10 enables objects such as wheel chairs, scooters or carts to be easily engaged, lifted and swung into a storage compartment of a vehicle. Because swing arm 28 pivots or rotates about a generally vertical axis that is horizontally offset from the center line or axis of vertical post 22, the overall length of swing arm 28 may be shortened while still being capable of positioning engaging mechanism 58 sufficiently rearward or to the side of vehicle 12 to engage an object resting on the ground adjacent the vehicle. Because the overall required length of swing arm 28 is reduced, engaging mechanism 32 supported at an end of swing arm 28 swings an engaged object into a center of the storage compartment.

This feature is especially advantage in vehicles having enlarged bumper overhangs or enlarged side step overhangs which space the storage compartment from the edge of the vehicle. It has been discovered that with such vehicles, the length of swing arm 28 must generally be increased so as to sufficiently span the enlarged bumper or side step overhang. Unfortunately, extending the length of swing arm 28 causes the engaging mechanism 32 to rotate about an enlarged radius. This enlarged radius prevents an engaged object supported at the end of the radius from being swung or rotated into the center of the storage compartment or trunk. In many cases, extension of the lift arm causes the object such as a wheel chair, scooter or cart to hit an opposite side of the vehicle when the swing arm is rotated about the vertical axis of the vertical post extending from the base.

However, the vehicle lift device 10 solves this problem. Because extension boom 24 offsets the vertical pivotal axis of swing arm 28 either rearwardly or over the side of the vehicle, the length of swing arm 28 required to position engaging mechanism 32 over the center of balance of the object is reduced. Because swing arm 28 rotates about a pivot axis offset from the axis of vertical post 22, many of the obstacles of short front to back trunk openings and trunk lid interference are eliminated. In addition, swing arm 28 is better able to position engaging mechanism 32 so as to pick up or lower an object or scooter to a sidewalk when the vehicle is parallel parked. This is extremely advantageous when curb cuts are scarce or in urban parking situations where there is insufficient room to load or unload the object from a rear of the vehicle.

Figure 2:
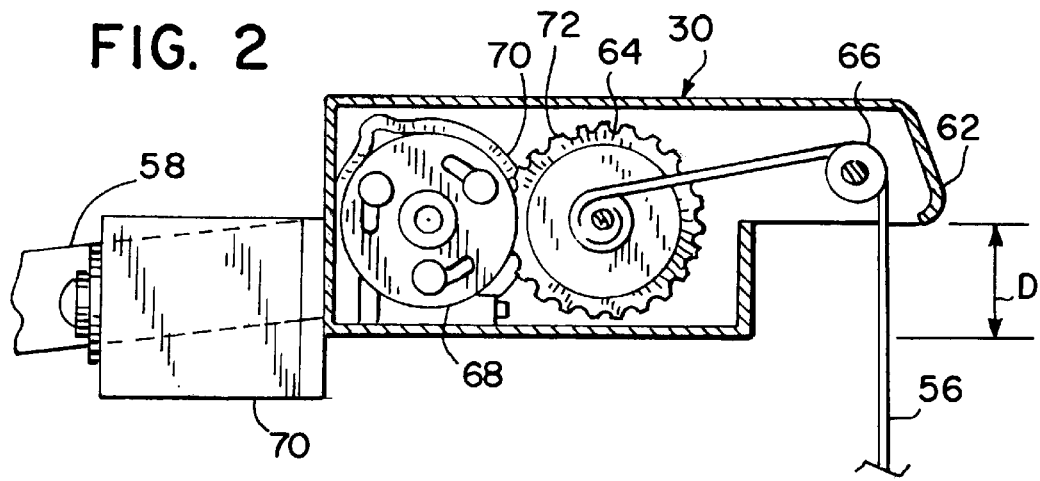
FIG. 2 is an enlarged side elevational view of a portion of the vehicle lift assembly with portions removed.

FIG. 2 is an enlarged side elevational view of an end portion of lift arm 54 including lift head 30. Portions of lift head 30 are omitted to better illustrate lift head 30. As shown by FIG. 2, lift head 30 includes housing 62, winding spool 64, pulley 66, actuator 68 and control assembly 70. Housing 62 encloses and supports winding spool 64, pulley 66 and actuator 68. Winding spool 64 is a generally cylindrical member sized for storing lift belt 56 when lift belt 56 is retracted and coiled about winding spool 64. Winding spool 64 preferably has a diameter sized sufficiently for receiving a majority of lift belt 32. In the preferred embodiment illustrated, winding spool 64 fixedly receives an end of lift belt 56 and includes a plurality of teeth 72 for engaging rotatory actuator 68.

Rotary actuator 68 is conventionally known and includes a plurality of teeth 70 for engaging teeth 72 of winding spool 64. As a result, rotary actuator 68 selectively rotates winding spool 64 to selectively wind or unwind belt 56 from about spool 64 so as to vary the length of belt 56 extending from lift head 30. Rotary actuator 68 is preferably controlled by a control assembly 70 mounted to lift arm 54 adjacent lift head 30. As can be appreciated, control assembly 70 may be manually controlled or controlled by a remote transmitter for controlling rotary actuator 68.

Pulley 66 is supported by housing 62 of lift head 30 proximate an outer most end of lift head 30 at a position above a lower most circumferential surface of winding spool 64. In the preferred embodiment illustrated, pulley 66 is preferably supported by housing of lift head 30 above a lower most end of lift head 30 and above the axial centerline of swing arm 28 and the axis of winding spool 64. As shown by FIG. 2, pulley 66 elevates the axis about which belt 56 is supported by distance D. In particular, pulley 66 supports belt 56 at an elevated height, with respect to the lower most surface of lift head 30. As a result, the extent to which swing arm 28 must be elevated to extend over and above an object for engaging the object is reduced. Reducing the required elevation of lift head 30 better enables vehicle lift assembly 10 to be utilized in vehicles having low floor to ceiling height such as small station wagons or sport utility vehicles.

What is claimed is:

1. A vehicle lift assembly for loading and unloading objects into a vehicle having a perimeter, the lift assembly comprising:

a base configured for being mounted to the vehicle;

a vertical post extending from the base;

an extension boom extending outward from the centerline of the post beyond the vehicle perimeter;

a swing arm rotatably coupled to the extension boom, the swing arm having an adjustable length extending from the extension boom and configured to extend over and behind the vertical post;

an engaging mechanism supported by the swing arm for releasably engaging an object; and an actuator coupled to the engaging mechanism to raise and lower the engaged object.

2. The lift assembly of claim 1 wherein the vertical post is vertically adjustable relative to the base.

3. The lift assembly of claim 2 wherein the vertical post is telescopically adjustable relative to the base.

4. The lift assembly of claim 1 wherein the swing arm includes:

a first arm rotatably coupled to the extension boom; and a second arm telescopically coupled to the first arm, wherein the second arm supports the engaging mechanism.

5. The lift assembly of claim 1 including:

an offset post extending from the extension boom; and a tube fixedly coupled to the swing arm and receiving the offset post, wherein the tube and the swing arm rotate about the the offset post.

6. The lift assembly of claim 1 wherein the swing arm rotates relative to the extension boom about a substantially vertical axis.

7. A vehicle lift assembly for loading and unloading an object into a vehicle having a perimeter, the lift assembly comprising:

a base configured for being mounted to the vehicle;

a vertical post telescopically coupled to the base;

an extension boom extending outward from the center line of the post and having a length adapted to extend beyond the vehicle perimeter;

a swing arm rotatably coupled to the extension boom, the swing arm having a telescopically adjustable length extending from the extension boom, wherein the swing arm is configured to extend over and behind the vertical post;

an engaging mechanism supported by the swing arm for releasably engaging the object; and an actuator supported by the swing arm and coupled to the engaging mechanism to raise and lower the engaging mechanism and to raise and lower the engaged object.

8. A vehicle lift assembly for loading and unloading objects into a vehicle, the lift assembly comprising:

a base configured for being mounted to the vehicle;

a vertical post coupled to the base and extending from the base;

an extension boom extending outward from the center line of the post;

a swing arm rotatably coupled to the extension boom, wherein the swing arm is configured to extend over and behind the vertical post;

an engaging mechanism supported by the swing arm for releasably engaging an object; and an actuator coupled to the engaging mechanism for raising and lowering the engaging mechanism to raise and lower the engaged object.

9. The vehicle lift assembly of claim 8, wherein the swing arm has an adjustable length extending from the extension boom.

10. The vehicle lift assembly of claim 9, wherein the swing arm is telescopically adjustable.

11. The swing arm of claim 8, wherein the actuator is mounted to the swing arm.

* * * * *